United States Patent
Buchhauser

(10) Patent No.: US 10,451,367 B2
(45) Date of Patent: Oct. 22, 2019

(54) DEVICE FOR SUPPLYING AN INERT GAS IN A BEVERAGE FILLING PLANT

(71) Applicant: KRONES AG, Neutraubling (DE)

(72) Inventor: Ulrich Buchhauser, Regensburg (DE)

(73) Assignee: KRONES AG, Neutraubling (DE)

(*) Notice: Subject to any disclaimer, the term of this patent is extended or adjusted under 35 U.S.C. 154(b) by 0 days.

(21) Appl. No.: 16/013,745

(22) Filed: Jun. 20, 2018

(65) Prior Publication Data
US 2018/0306535 A1    Oct. 25, 2018

Related U.S. Application Data

(62) Division of application No. 15/072,282, filed on Mar. 16, 2016.

(30) Foreign Application Priority Data

Mar. 17, 2015    (DE) .................. 10 2015 103 961

(51) Int. Cl.
| | | |
|---|---|---|
| *B65B 31/00* | (2006.01) | |
| *F28F 23/00* | (2006.01) | |
| *B29C 49/42* | (2006.01) | |
| *B67C 3/10* | (2006.01) | |
| *B67C 7/00* | (2006.01) | |
| *B29C 49/08* | (2006.01) | |

(Continued)

(52) U.S. Cl.
CPC .............. *F28F 23/00* (2013.01); *B29C 49/08* (2013.01); *B29C 49/085* (2013.01); *B29C 49/12* (2013.01); *B29C 49/42* (2013.01); *B65B 31/00* (2013.01); *B65B 55/025* (2013.01); *B67C 3/10* (2013.01); *B67C 7/00* (2013.01); *F28D 21/0001* (2013.01); *B29C 49/46* (2013.01); *B29C 2049/4605* (2013.01); *B29C 2049/4685* (2013.01); *B29C 2049/4694* (2013.01)

(58) Field of Classification Search
CPC ..................................................... B29C 49/4284
See application file for complete search history.

(56) References Cited

U.S. PATENT DOCUMENTS

| | | |
|---|---|---|
| 4,409,775 A | 10/1983 | Brody et al. |
| 6,047,547 A | 4/2000 | Heaf |

(Continued)

FOREIGN PATENT DOCUMENTS

| | | |
|---|---|---|
| DE | 3226172 | 1/1984 |
| DE | 102009044258 | 5/2011 |

(Continued)

OTHER PUBLICATIONS

Non-Final Office Action, U.S. Appl. No. 15/072,282, dated Jul. 12, 2018, 8 Pages.

(Continued)

*Primary Examiner* — Monica A Huson
*Assistant Examiner* — Kelsey C Grace
(74) *Attorney, Agent, or Firm* — Haynes and Boone, LLP

(57) ABSTRACT

A method and device for supplying an inert gas in a beverage filling plant are provided. The method includes feeding surplus process heat from the beverage filling plant to a heat exchanger, feeding an inert gas from an inert gas source to the heat exchanger, heating the inert gas in the heat exchanger, and supplying the heated inert gas for use in the beverage filling plant.

3 Claims, 1 Drawing Sheet

(51) Int. Cl.
*F28D 21/00* (2006.01)
*B29C 49/12* (2006.01)
*B65B 55/02* (2006.01)
*B29C 49/46* (2006.01)

(56) References Cited

U.S. PATENT DOCUMENTS

2007/0031309 A1    2/2007  Jain et al.
2012/0107473 A1*   5/2012  Lowe ..................... A23L 2/54
                                                          426/477
2012/0240522 A1    9/2012  Wasmuht et al.

FOREIGN PATENT DOCUMENTS

| DE | 102013103192 | 10/2014 |
| EP | 0899195 | 11/2001 |
| EP | 2546047 | 1/2013 |
| WO | WO 2008/116583 | 10/2008 |
| WO | WO 2011/045126 | 4/2011 |

OTHER PUBLICATIONS

Search Report, German Patent Application No. DE 10 2015 103 961.3, dated Nov. 10, 2015, 8 pages.

\* cited by examiner

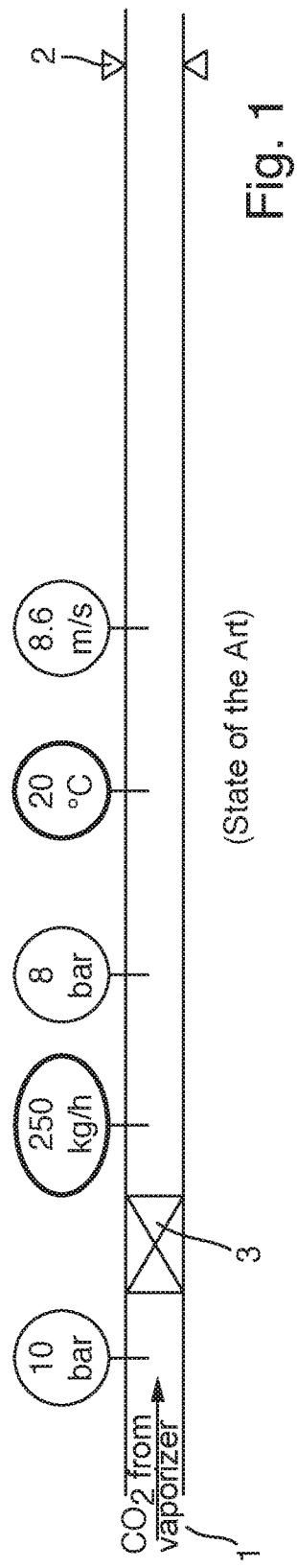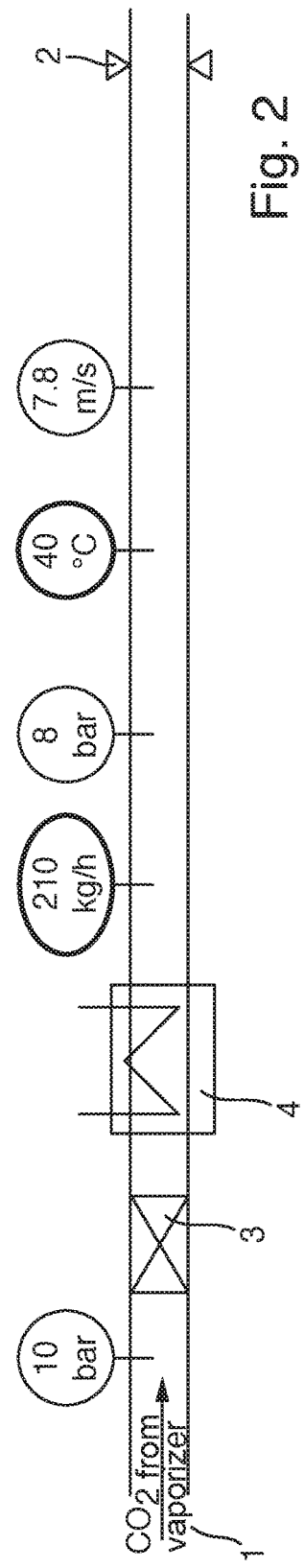

DEVICE FOR SUPPLYING AN INERT GAS IN A BEVERAGE FILLING PLANT

CROSS REFERENCE TO RELATED APPLICATIONS

This application is a divisional of U.S. patent application Ser. No. 15/072,282 filed on Mar. 16, 2016 and entitled "METHOD AND DEVICE FOR SUPPLYING AN INERT GAS IN A BEVERAGE FILLING PLANT," which claims priority from German Patent Application No. DE 10 2015 103 961.3, filed on Mar. 17, 2015 in the German Patent and Trademark Office, the disclosures of which are incorporated herein by reference in their entirety.

BACKGROUND

Technical Field

The present invention relates to a method and a device for supplying an inert gas in a beverage filling plant, for example for supplying $CO_2$ for rinsing or pre-pressurizing containers that are to be filled in a beverage filling plant.

State of the Art

It is known in beverage filling plants to use inert gases for rinsing and for pre-pressurizing containers that are to be filled. The rinsing with an inert gas of a container that is to be filled serves, for example, to expel from it atmospheric oxygen that is present in the container after it is manufactured or supplied, in order to provide a low-oxygen or oxygen-free atmosphere in the container that is to be filled. By providing the low-oxygen or oxygen-free atmosphere in the container, it is possible to achieve an improved product quality in the filled container, particularly when oxygen-sensitive products are filled.

It is further known, particularly when beverages containing $CO_2$ are filled, to pre-pressurize with a pressure gas the containers that are to be filled prior to the introduction of the actual fill product, in order to avoid excessive release of the $CO_2$ during the filling process, and thereby avoid an excessive tendency of the fill product to foam. This method is also known as the counter-pressure filling method.

It is further known, particularly with oxygen-sensitive fill products, to rinse with an inert gas the head space of the filled container, i.e., the space above the level of the fill product up to the mouth of the container, before the container is closed with the container closure. In this manner, it can also be achieved that only a small portion of atmospheric oxygen, or oxygen, remains in the closed container. By this means too, the product quality in the container can be maintained and the storage properties of the fill product improved.

In the field of beverage filling plants, the inert gas that is used is in particular $CO_2$, which is used both to rinse the containers and the head space and to pre-pressurize the containers that are to be filled. This $CO_2$ is, for example, fed from a $CO_2$ source, for example a $CO_2$ tank or a $CO_2$ vaporizer, and then used in the beverage filling plant. Large quantities of $CO_2$ are used during a filling operation.

Oxygen-sensitive fill products are, for example, fruit juices, fruit spritzers or beer. These products can oxidize if oxygen is present, and therefore the product quality can suffer if a portion of oxygen is present in the container that is to be filled or has been filled.

SUMMARY

An improved device and method for supplying an inert gas are described.

Accordingly, a method for supplying an inert gas in a beverage filling plant is provided in one embodiment, comprising the steps of feeding surplus process heat from the beverage filling plant to a heat exchanger, feeding an inert gas from an inert gas source to the heat exchanger, heating the inert gas in the heat exchanger, and supplying the heated inert gas for use in the beverage filling plant.

Due to the fact that surplus (e.g., excess or unused) process heat from the beverage filling plant is fed to a heat exchanger, and the inert gas is then heated in the heat exchanger, a higher volume of inert gas can be supplied, from the same quantity of inert gas, than would be the case without heating. A greater volume flow of inert gas in the beverage filling plant can thereby be achieved with the same supplied quantity of inert gas, or the same volume flow can be supplied with a smaller quantity of inert gas. In this manner, either a further improvement in the use of the inert gas can be brought about, or else more efficient or more economical use of the inert gas can be achieved, in that a smaller initial quantity of inert gas can be used.

In addition, by means of the use of surplus process heat from the beverage filling plant, the required thermal energy for heating the inert gas can be supplied efficiently and economically.

In various embodiments, the inert gas is heated in the heat exchanger to between about 20° C. and about 90° C., for example between about 30° C. and about 60° C., between about 35° C. and about 45° C., or to about 40° C. In this temperature range, it is possible to achieve simultaneously a good balance between, on the one hand, significantly higher volume from a given quantity of inert gas, and on the other hand only slight or non-existent impact or impairment of the fill product and the container due to the additional thermal energy that is applied. In connection with this, it should be ensured that the temperature of the inert gas in combination with the volume flow of the inert gas is such as to avoid undesired heating of the fill product.

The adjustment of the inert gas to the correct temperature also enables the prevention of undesired heating of the container that is to be filled. This can be important when plastic containers are filled, since it is not usually desired to deform these during pre-pressurization. Accordingly, when pre-pressurization pressure is applied by means of the inert gas, the container that is to be filled should be prevented from exceeding a temperature at which it becomes deformable.

The surplus process heat is, in various embodiments, supplied from other areas of the beverage filling plant, for example from a bottle washing machine, a stretch blow molding machine, an oven of the stretch blow molding machine, a pasteurizer (in particular a tunnel pasteurizer), a container warmer, drive systems of the beverage filling plant, an air compressor (for example from a stretch blow molding machine), surplus heat from the product treatment (for example high temperature short time (HTST) pasteurization or ultra-high-temperature processing), surplus heat from a cleaning system (for example a clean-in-place (CIP) system), or a block heat and power plant for operating the beverage filling plant.

In each case, the surplus heat can, for example, be transferred directly to the heat exchanger via the media that are used to carry thermal energy in the individual components of the plant, or alternatively an additional heat exchanger is provided on each of the components of the plant, via which the surplus heat, in combination with a medium to transport it, is conveyed to the heat exchanger for heating the inert gas.

In this manner, surplus process heat that would in any case be produced can be used to raise the inert gas to the desired temperature in the heat exchanger. No additional thermal energy is therefore needed, since surplus heat can be used instead.

The inert gas that is supplied at an increased temperature can be used, for example, as blow molding fluid for stretch blow molding of containers that are to be filled; for rinsing containers that are to be filled prior to filling, for example in a rinser or a filler; for pre-pressurizing the containers; for inertization of the head space during filling or after filling until capping takes place; as an overlay in a product bowl; for inertization of the container transport path in an isolator and/or headspace isolator; for destroying foam that is present in the head space of a container after it has been filled; for gas treatment of a container cover; for blowing onto the containers, for example to dry them; as an outlet airlock of, for example, closures; or any combination thereof. Many other possible uses are conceivable in a beverage filling plant for the inert gas, which is supplied at the raised temperature.

A device for supplying an inert gas in a beverage filling plant is also provided. The device comprises an inert gas source and a supply valve for supplying the inert gas for use in the beverage filling plant. According to one embodiment of the present invention, a heat exchanger for heating the inert gas is provided between the inert gas source and the supply valve.

BRIEF DESCRIPTION OF THE FIGURES

Further embodiments and aspects of the present invention are more fully explained by the description below of the figures.

FIG. 1 shows a schematic representation of a device for supplying an inert gas according to the state of the art; and FIG. 2 shows a schematic representation of a device for supplying an inert gas according to an example embodiment of the present invention.

DETAILED DESCRIPTION

Examples of embodiments are described below with the aid of the figures. In the figures, elements which are identical or similar, or have identical effects, are designated with identical reference signs. In order to avoid redundancy, repeated description of these elements is in part dispensed with.

FIG. 1 shows a device according to the state of the art, in which an inert gas is supplied from an inert gas source 1 to a supply valve 2 for use in a beverage filling plant. In the channel from the inert gas source 1 to the supply valve 2, a pressure reducer 3 is provided, by means of which a flow of the inert gas at a constant pressure can be achieved at the supply valve 2.

FIG. 1 specifies as the inert gas source 1, a vaporizer, in which liquid inert gas is transformed into the gaseous phase, and accordingly then supplied as gaseous inert gas.

In the example according to the state of the art that is shown, the inert gas, for example $CO_2$, is supplied from the inert gas source 1 at a pressure of for example 10 bar, which is reduced in the pressure reducer 3 to a pressure of 8 bar. The inert gas is then present at the supply valve 2, for example, at a pressure of 8 bar and a temperature of 20° C., wherein in this case $CO_2$ can be delivered to the supply valve 2 at a rate of, for example, 250 kg/h.

FIG. 2 shows an example embodiment of the present invention, according to which an inert gas source 1 is again provided, by means of which the inert gas can be supplied to a pressure reducer 3, for example, once again at a pressure of 10 bar. In this case, however, downstream of the pressure reducer 3, a heat exchanger 4 is additionally provided, by means of which the inert gas that is present downstream of the pressure reducer 3 can be heated, for example, to 40° C. The heated inert gas is then once again present at the supply valve 2 of the beverage filling plant at a pressure of 8 bar.

By means of the heating of the inert gas in the heat exchanger 4, it can be achieved, in comparison with the state of the art, that a greater volume of gas can be supplied using the same quantity of inert gas, or—as shown schematically in the example embodiment—an equivalent volume of inert gas can be supplied although a reduced quantity of inert gas is used. In the example embodiment shown here, for example, only 210 kg/h is used and supplied to the supply valve 2.

The heat exchanger 4 is fed with surplus process heat that arises at another position in the beverage filling plant. Accordingly, thermal energy that is already available is used to raise the inert gas downstream of the pressure reducer 3 to the increased temperature. By means of the use of surplus process heat, the necessity to use additional energy to heat the inert gas can accordingly be avoided.

Downstream of the supply valve 2, the heated inert gas can thus be used in the beverage filling plant, for example, as blow molding fluid for stretch blow molding of containers; for rinsing the containers, for example, in a rinser or in the filler itself, before they are filled with the actual fill product; for pre-pressurizing the containers in the case of counter-pressure filling; for inertization of the head space during filling or after filling, for example, until capping takes place, as an inert gas overlay in a product bowl; or for inertization of the container transport path, for example, in an isolator or a headspace isolator. The inert gas can further be used to destroy the foam in the head space of a filled bottle; for gas treatment of container covers; for purging container closures; or to blow dry containers after they have been cleaned. The inert gas can also be used as an airlock gas or a seal gas in an airlock, for example, in a closure airlock.

The heat exchanger 4 can, in various embodiments, be supplied with surplus process heat from one or more of a bottle washing machine, a stretch blow molding machine (in particular its oven), a tunnel pasteurizer, a container warmer, drive systems of the beverage filling plant, an air compressor (for example from a stretch blow molding machine), from the product treatment (for example HTST pasteurization or ultra-high-temperature processing), or from a cleaning system (for example a CIP system of the beverage filling plant). The process heat can further be supplied as surplus heat from a block heat and power plant, which serves to operate the beverage filling plant.

In this manner it is possible to use this quantity of surplus process heat, which would otherwise be discarded, to heat the inert gas in the heat exchanger 4.

The inert gas is, in various embodiments, heated in the heat exchanger 4 to temperatures of about 20° C. to about 90° C., such as about 30° C. to about 60° C., about 35° C. to about 45° C., and to about 40° C. By means of the specified temperatures, and in particular a choice of temperatures, it is possible firstly to exclude impairment of the fill product by treating it with the inert gas, and secondly to ensure that a container treated with the inert gas is not altered or deformed during or prior to filling.

To the extent applicable, all individual features described in the individual example embodiments can be combined with each other and/or exchanged, without departing from the field of the invention.

What is claimed is:

1. A device for supplying an inert gas in a beverage filling plant comprising:
   an inert gas source;
   a supply valve configured to supply the inert gas;
   a heat exchanger configured to heat the inert gas, the heat exchanger disposed between the inert gas source and the supply valve, and connected to a feed of surplus process heat of the beverage filling plant; and
   a pressure reducer disposed between the inert gas source and the heat exchanger.

2. The device of claim 1, wherein the inert gas source provides a substantially pure inert gas.

3. The device of claim 1, wherein the inert gas source comprises a vaporizer.

* * * * *